3,000,867
NOVEL ETHYLENE-PROPYLENE COPOLYMER AND METHOD FOR PRODUCING SAME

Bruce S. Fisher, Brandywine Hundred, Del., assignor to E. I. du Pont de Nemours and Company, Wilmington, Del., a corporation of Delaware
No Drawing. Filed Apr. 15, 1959, Ser. No. 806,458
4 Claims. (Cl. 260—88.2)

This invention relates to novel copolymers and more particularly to ethylene-propylene copolymers which may be cured to form highly useful elastomers.

Ethylene and propylene today are very important polymer intermediates because they are commercially available in great volume at very low cost. It is known that they can be copolymerized to give products ranging in form from low molecular weight oils to high molecular weight solids. Unfortunately, these copolymers have exhibited shortcomings which have hindered commercial development as elastomers. In particular, ethylene-propylene elastomers have exhibited deficient snap and resilience as well as inferior tensile strength.

It is an object of the present invention to provide novel copolymers of ethylene and propylene. It is a further object to provide ethylene-propylene copolymers which may be cured to form highly useful elastomers. A still further object is to provide a process for preparing these ethylene-propylene copolymers and to provide a process for curing the same. Other objects will appear hereinafter.

These and other objects of this invention are accomplished by an ethylene-propylene copolymer which is capable of being cured to an elastomer, said copolymer having an intrinsic viscosity in tetrachloroethylene at 30° C. of at least 1 and exhibiting an infrared absorbence ratio ranging from about 0.85 to about 2.0, said infrared absorbence ratio being the ratio of the infrared absorbence at 8.5 microns to the absorbence at 2.3 microns of a film of said copolymer about 0.1 mm. thick.

The novel copolymers of the present invention may be prepared by contacting ethylene and propylene in solution with a specific coordination catalyst at temperatures between about 20° C. and 60° C. in the absence of oxygen and water vapor. The copolymers obtained as a result of this process are rubbery high molecular weight elasto-plastics exhibiting intrinsic viscosities (in tetrachloroethylene at 30° C.) of at least 1.0 and are millable and capable of being cured to form strong, resilient, high tensile strength elastomers.

In order that these copolymers may be cured to form highly useful elastomers it is necessary that they be millable and exhibit an intrinsic viscosity in tetrachloroethylene at 30° C. of at least 1.

It has been determined that the copolymers of this invention must contain at least a certain minimum propylene content in order that highly useful, cured elastomers may be obtained therefrom. In this regard it is known that polyethylene homopolymers are not curable to elastomers. Accordingly, the copolymers of this invention have been defined as exhibiting a strong enough infrared absorption at 8.65 microns so that the ratio of this absorbence to that of a reference band at 2.3 microns of a copolymer film about 0.1 mm. thick, is at from about 0.85 to about 2.0. The infrared absorbence at 8.65 microns is believed to be a measure of the propylene content. Thus, propylene exhibits a strong absorption band at 8.65 microns, polyethylene displays none. The absorption measurements are made on pressed films about 0.1 mm. thick. In order to compensate for variations in film thickness, the absorbence of a reference band at 2.3 microns is measured in addition to the band at 8.65 microns. An infrared absorbence ratio figure of 0.85 indicates the presence of the necessary minimum number of propylene units.

As mentioned above, the novel copolymers of this invention are prepared by contacting ethylene and propylene with a specific coordination catalyst. It is preferred that the catalyst be soluble in the reaction medium. A suitable catalyst is formed by mixing together, in turn, aluminum chloride, aluminum triisobutyl, and vanadyl chloride. The molar ratio of aluminum chloride to aluminum triisobutyl is 2:1 and the molar ratio of aluminum to vanadium is 5:1. Many catalyst combinations, which are closely related to the preferred combination, cannot be substituted for it.

The following tables show the absorbence ratio figures of copolymers prepared from the above catalyst (Table I) and of copolymers prepared with another catalyst (Table II).

Table I

[Copolymerization of Ethylene and Propylene Al(iso-Bu)$_3$-AlCl$_3$-VoCl$_3$ Catalyst Tetrachloroethylene Solvent]

| Molar ratio propylene/ethylene in gas feed | Q Values of copolymer films [1] | Intrinsic viscosity |
|---|---|---|
| 1:1 | 1.0 | 4.5 |
| 2:1 | 1.3 | 3.6 |
| 3:1 | 1.6 | 3.2 |
| 4:1 | 1.7 | 3.5 |
| 5.7:1 | 1.9 | 3.5 |
| Polypropylene | 3.95 | |

[1] Absorbence at 8.65 microns/absorbence at 2.3 microns.

The results collected in Table I show that as the relative proportion of propylene in the feed gas increases the value of Q—which is a measure of propylene content of the copolymer—tends to a limiting value. Furthermore, this limiting value of Q is considerably less than the value of Q for polypropylene.

When using another catalyst, as the ratio of propylene to ethylene in the feed gas was increased, the copolymers obtained absorbed more and more prominently at 8.65 microns. The limiting Q value considerably exceeded that indicated in Table I and approached that for a propylene homopolymer.

Table II

[Copolymerization of Ethylene and Propylene Al(iso-Bu)$_3$-VOCl$_3$ Catalyst Tetrachloroethylene Solvent]

| Molar ratio propylene/ethylene in gas feed | Q Values of copolymer films [1] | Intrinsic viscosity |
|---|---|---|
| 1:1 | 1.4 | 5.2 |
| 4:1 | 2.9 | 3.2 |
| 7:1 | 3.2 | 2.88 |
| Polypropylene | 3.95 | |

[1] Absorbence at 8.65 microns/absorbence at 2.3 microns.

The novel copolymers of this invention may be prepared by a wide variety of procedures. With any procedure it is necessary that the operation be carried out under a blanket of inert gas, such as nitrogen or argon, in order to avoid contamination by atmospheric oxygen and water vapor. The temperature of the operation may range from about 20° C. to about 60° C.; the ethylene and propylene are contacted in a tetrachloroethylene solution.

In a typical procedure a glass reaction vessel, equipped with a glass agitator, gas inlet and outlet tubes and openings to permit the introduction of liquid reagents, is charged under nitrogen with tetrachloroethylene which has been purified by distillation from calcium hydride or by passage through a column of silica gel. Agitation is started and a mixture of ethylene and propylene gases is continuously introduced through the gas-inlet tube below the liquid surface. The nitrogen inflow is discontinued.

The relative amounts of ethylene and propylene in the gas feed stream are controlled by suitably calibrated rotameters which are placed in the gas feed lines ahead of the T in which the gases are mixed. Prior to their introduction into the reactor, the gases are purified from oxygen, water vapor and other contaminants reactable with aluminum triisobutyl by passage through a scrubber containing aluminum triisobutyl. After the ethylene-propylene mixture has been introduced for 10–15 minutes, the tetrachloroethylene is substantially saturated with each monomer. Monomer inflow is continued and excess gas is allowed to escape through the gas outlet tube through a bubble-trap filled with Nujol to prevent back-flow of air. A concentrated solution of $VOCl_3$ in tetrachloroethylene is then added to the tetrachloroethylene solution of ethylene and propylene by means of a hypodermic needle through an opening in the reactor sealed with a soft rubber cap. The amount of $VOCl_3$ added is such that its concentration in the reaction mass is $5 \times 10^{-4}$ to $5 \times 10^{-3}$ mols/liter. Then a concentrated aluminum catalyst solution (made by dissolving aluminum triisobutyl and aluminum chloride in tetrachloroethylene) is added with a syringe. Reaction occurs at once and an intense violet-to-pink color appears. Ethylene and propylene are absorbed and the temperature of the charge increases. Cooling is applied, as desired. As the copolymerization reaction proceeds the charge becomes increasingly viscous. Introduction of the monomer gas mixture is stopped when the agitation becomes ineffective. The concentration of copolymer in the solution at this point is usually 3 to 5 percent by weight; generally this concentration is attained in 60 to 180 minutes when the temperature of the reaction mass is maintained in the range of 30° C. to 50° C.

The catalyst is deactivated by introduction of a low molecular weight alcohol such as isopropanol or n-butanol to the reaction mass. An antioxidant is often added, too. The product is then isolated by pouring the mass into 2 to 3 volumes of n-butanol. Copolymer separates as a rubbery, swollen solid which is subsequently squeezed free of excess solvent, washed several times with fresh n-butanol, slurried with acetone in a high-speed blendor and dried by sheeting on a warm rubber mill. An antioxidant, such as 2,2'-methylenebis(6-tert-butyl-4-methylphenol) or 4,4'-bis(6-tert-butyl-m-cresol)sulfide, is incorporated during the drying operation to avoid possible oxidation and degradation of the copolymer.

The novel copolymers of this invention are rubbery in nature and, in general, are more resilient and snappy than conventional ethylene-propylene copolymers. These copolymers may be cured to form highly useful elastomers. Any of a wide variety of curing procedures may be employed. Thus the copoylmers may be cured with free radical generators, particularly peroxides, or they may be brominated to introduce cure sites which permit subsequent vulcanization with sulfur.

In carrying out a free radical cure of the copolymers, it is merely necessary to mix, by standard procedures, a free radical generator with the copolymer and to heat until a cure is obtained. The temperature range may vary within wide limits depending upon the particular free radical generator being used. However, heating to temperatures of about 50–175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha,alpha-dimethylbenzyl) peroxide, dibenzoyl peroxide, di-tert-butyl peroxide, cumene hydroperoxide, methyl ethyl ketone peroxide, tert-butyl perbenzoate and di-N-methyl-tert-butyl percarbamate. Bis(alpha,alpha-dimethylbenzyl)peroxide, often called dicumyl peroxide, is particularly preferred. About 2.5 to 3 parts by weight is used for every 100 parts by weight of the copolymer. The compounded stock is then cured at about 150° C. for about 30 to 60 minutes.

In addition to the free radical generator, a free radical acceptor may be present such as N-substituted maleimide, an N,N'-substituted bismaleimide, an N,N'-substituted bisacrylamide, a cyclic triacryloylhexahydrotriazine, or mixtures thereof. The quantity of free radical acceptor may range from about 0.5 to 6% by weight of the copolymer. The weight of the free radical acceptor may be less, equal to, or more than the weight of the free radical generator.

The maleimides are compounds having the formula:

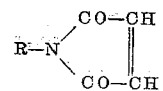

wherein R is an alkyl or an aryl radical. Representative maleimides include compounds such as N-methyl maleimide, N-phenyl maleimide and N-pyrenyl maleimide. The bismaleimides may be represented by the formula:

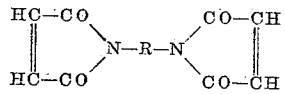

wherein R is an alkylene or an arylene radical. Representative bismaleimides include N,N'-ethylene bismaleimide, N,N'-phenylene bismaleimide and N,N'-pyrenylene bismaleimide. The bisacrylamides which may be used in the process of the present invention may be represented by the formula:

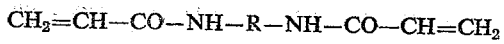

wherein R is an alkylene or an arylene radical. Representative compounds include methylene bisacrylamide and phenylene bisacrylamide.

When the free radical acceptors are used, azobisaliphatic nitriles may be employed as free radical generators. Representative compounds are 1,1'-azobisisobutyronitrile, 1,1'-azobis(alpha,gamma-dimethyl valeronitrile) and 1,1'-azobiscyclohexane carbonitrile.

The copolymers of this invention may be brominated to introduce cure sites which permit subsequent vulcanization with sulfur. This bromination may be accomplished at room temperature, about 25° C., by exposing a carbontetrachloride solution of the copolymer and bromine to ultraviolet light until decolorization occurs. In a representative procedure, 5 parts by weight of bromine is supplied for each 100 parts by weight of copolymer. A 1.3% solution in carbontetrachloride is exposed for one hour to ultraviolet light, ethylene is introduced to consume residual bromine, and the ethylene bromide formed is subsequently stripped off under vacuum (along with the carbon tetrachloride) to give the brominated copolymer.

In carrying out a sulfur cure of the brominated copolymers, the copolymer is compounded on a rubber roll mill with sulfur, conventional accelerators, zinc oxide, and magnesium oxide, optionally carbon black, and heated until a cure is obtained. Curing at a temperature of about 125 to 160° C. for a period of one-half to several hours is generally sufficient. In a typical procedure 100 parts of the brominated copolymer is compounded with 2 parts of magnesium oxide, 5 parts of zinc oxide, 1 part of 2,2'-dithiobisbenzothiazole, 1 part of tellurium diethyldithiocarbamate, and 1 part of sulfur. Optionally, superabrasion furnace black is added. In a representative recipe, 45 parts of this black is used for each 100 parts by weight of copolymer. Various procedures and modifications of sulfur curing are more particularly described in Encyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Company, Inc., New York, 1948, pages 556–566;

and Chemistry and Technology of Rubber, Davis and Blake, published by Reinhold Publishing Corporation, New York, 1937, vol. 74, Chapter VI.

A wide variety of compounding agents may be incorporated with these copolymers at the time they are cured in order to improve various properties. Thus, they may be loaded with carbon black in order to increase the tensile strength. Other compounding agents include titanium dioxide and silica.

The copolymers of this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability and excellent resistance to ozone. The uncured but compounded copolymers are not affected by moisture but can be stored for lengthy periods before shaping and vulcanizing.

The following examples will better illustrate the nature of the present invention; however, the invention is not intended to be limited to these examples. Parts are by weight unless otherwise indicated.

EXAMPLE 1

A. *Preparation of Catalyst Solution 1—A*

A 500-ml. 4-neck glass reaction flask, equipped with a glass paddle agitator, a thermometer, and nitrogen inlet and outlet tubes, is charged at room temperature with 180 milliliters of tetrachloroethylene (which has been purified by passage through a column of silica gel), 15 grams (0.075 mole) of aluminum triisobutyl, and 4.8 grams (0.036 mole) of aluminum chloride. The mixture obtained is agitated under nitrogen while external heat is applied to raise the temperature to about 100–110° C. When after about 15 minutes, all the aluminum chloride has dissolved, the heat is removed and the clear nearly colorless solution is allowed to cool to room temperature under nitrogen.

6.6 grams of aluminum chloride is subsequently added with stirring to 100 milliliters of the above solution at 100° C. while a protective nitrogen atmosphere is provided. 2.5 milliliters of the 1.0 molar solution thereby obtained is diluted to 100 milliliters with tetrachloroethylene to give Catalyst Solution 1—A (0.025 molar).

B. *Preparation of ethylene-propylene copolymer*

A nitrogen blanket is used in all operations to avoid contamination by atmospheric oxygen and water vapor.

A 2-liter 4-neck round-bottom glass reaction flask fitted with a glass paddle agitator, a thermometer, gas inlet and outlet tubes, and an opening to permit the introduction of liquid reagents, is charged under nitrogen at room temperature with 900 milliliters of silica gel purified tetrachloroethylene. Then 0.05 milliliter (0.0005 mole) of vanadyl chloride is introduced by means of a hypodermic needle through an opening in the reactor sealed with a rubber cap.

A gaseous monomer mixture introduced through the gas-inlet tube supplies ethylene and propylene at the rate of 750 and 1500 cc./min., respectively. The relative amounts of the monomers in this feed stream are controlled by suitably calibrated rotameters which are placed in the individual monomer feed lines ahead of the T in which the gases are mixed. Prior to its entrance into the reactor, the mixture passes through a 25 volume percent solution of aluminum triisobutyl in Decalin. In about 15 minutes the tetrachloroethylene is saturated; excess gas is allowed to escape through the gas-outlet tube into a bubble-trap filled with a hydrocarbon oil to prevent back-flow of air into the reactor.

While introduction of the gas mixture (1500 cc./min. of propylene; 750 cc./min. of ethylene) is continued, 100 milliliters of Catalyst Solution 1—A is introduced over a 1-minute period from a 125-ml. addition funnel attached to an opening in the reactor. Reaction occurs at once, the mass assumes an intense pinkish-violet hue. Ethylene and propylene are absorbed and the temperature of the charge climbs to 47° C. within 11 minutes. External cooling is applied. During the next 34 minutes a gas mixture containing equal volumes of the monomers is introduced at the rate of 2000 cc./minute. The temperature of the charge reaches a maximum of 60° C. in about 19 minutes, falling afterward to 52° C. As the copolymerization proceeds the charge becomes increasingly viscous until agitation ultimately becomes ineffective.

The catalyst is then deactivated by introducing 10 milliliters of n-butanol into the reaction mass. Subsequent addition of the reaction mass to thrice its volume of n-butanol causes the copolymer to separate as a rubbery swollen solid. The product is squeezed free of excess solvent, washed several times with fresh n-butanol, slurried with acetone in a high-speed blender, and dried by sheeting on a rubber roll mill at 100° C. (About 0.2 part by weight of 4,4′-bis(6-tert-butyl-m-cresol)sulfide is milled into the polymer during the drying operation to protect it from possible oxidation and degradation.)

37 grams of the copolymer is thereby obtained as a colorless, snappy elastomer which displays an intrinsic viscosity of 5.7. The absorbence ratio value of a pressed film is 1.0. A sample of polymer stretched to 700% elongation displays orientation effects (X-ray analysis shows a crystallinity spot $d=3.9$–$4.0$ A.).

EXAMPLE 2

A. *Apparatus*

A nitrogen blanket is used to avoid contamination by atmospheric oxygen and water vapor.

A 1-liter cylindrical glass resin flask is employed which is fitted with a glass counter-pitched 2-bladed agitator, gas inlet and outlet tubes, a thermometer, a thermometer holder with a rubber syringe cap, and openings to permit the introduction of liquid reagents. The gas outlet tube leads to a cold trap (surrounded with an ice-acetone bath) and thence to a bubble-trap filled with a hydrocarbon oil to prevent back-flow of air into the reactor.

The relative amounts of ethylene and propylene in the gas feed stream are controlled by suitably calibrated rotameters which are placed in the gas feed lines ahead of the T in which the gases are mixed. Prior to their introduction into the reactor, the gases are passed through a silica gel drying tower, an "ascarite" tower, thence through a 25% solution (by volume) of aluminum triisobutyl in Decalin, and finally through a cold trap (packed with a mixture of ice).

B. *Preparation of ethylene-propylene copolymer*

1000 milliliters of tetrachloroethylene is distilled from calcium hydride and collected directly in the reaction flask. Then 10 cc. of a 0.1 molar solution of vanadyl chloride in tetrachloroethylene is introduced by means of a hypodermic needle through the syringe cap.

Catalyst Solution 2—B is separately prepared at 100° C. under nitrogen by agitating 18.7 grams (0.14 mole) of aluminum chloride and 16.5 cc. (0.07 mole) of aluminum triisobutyl in 183 milliliters of tetrachloroethylene which has been purified by passage through a column of silica gel. When all the aluminum chloride is dissolved, the clear nearly colorless solution is allowed to cool to room temperature.

A mixture of ethylene (rate: 400 cc./min.) and propylene (rate: 1600 cc./min.) (molar ratio ethylene:propylene=1:4) is passed through the vanadyl chloride solution in the reactor at about 32° C. for 15 minutes; by then a saturation concentration of each monomer has been established. Excess gas escapes through the gas outlet tube. 5.0 milliliters of Catalyst Solution 2—B is added to the reaction mass in a 5-second period by means of a hypodermic needle. At once a deep violet color appears and the temperature of the charge rises to about 41° C. During the next 2 hours and 26 minutes the reaction mixture is agitated at 39-42° C. while 1600 cc. of propylene and 400 cc. of ethylene are steadily introduced during each minute-period. As the copolymerization proceeds the charge becomes increasingly viscous; finally the agitation becomes ineffective. The catalyst is then destroyed by adding 5 cc. of n-butanol; 0.5 gram of 2,2'-methylenebis(6-tert-butyl-4-methylphenol) is introduced. The reaction mass is poured into 2 liters of n-butanol to isolate the copolymer which separates as a rubbery, swollen solid. It is washed with acetone and partially dried under vacuum at 100° C.; 0.1% by weight 2,2'-methylenebis(6-tert-butyl-4-methylphenol) is introduced into the copolymer at 60° C. on a rubber roll mill. Finally the copolymer is dried at 110° C. (1.5 mm. Hg) for 1 hour. 30.4 grams of a resilient snappy copolymer is obtained exhibiting an intrinsic viscosity of 3.52. A pressed film exhibits an absorbence ratio value of 1.71.

C. Preparation of ethylene-propylene copolymer

The procedure of Part B above is repeated except: (1) after the Catalyst Solution 2—B is added, the composition of the gas mixture is changed so that ethylene and propylene are introduced at rates of 500 cc./minute and 1500 cc./minute, respectively; (2) during the first half-hour the temperature of the charge rises to 44.5° C. and thereafter climbs more slowly to reach a maximum of 48° C. a half-hour before the viscosity of the mixture makes it necessary to stop the run. 49.3 grams of a snappy resilient cold-drawing copolymer is obtained which exhibits an intrinsic viscosity of 3.20. A pressed film exhibits an absorbence ratio value of 1.67.

D. Preparation of ethylene-propylene copolymer

The procedure of Part B above is repeated except that: (1) after the Catalyst Solution 2—B is added, the composition of the gas mixture is changed so that ethylene and propylene are introduced at rates of 700 cc./minute and 1400 cc./minute, respectively; (2) the reaction is initiated at 34° C. and lasts only 2 hours; (3) during the first half-hour the temperature of the charge rises to 48° C. and thereafter climbs more slowly to reach a maximum of 52° C. 10 minutes before the reaction becomes too viscous to continue. 44.3 grams of a tough snappy copolymer is obtained which exhibits an intrinsic viscosity of 3.60. A pressed film exhibits an absorbence ratio value of 1.29.

E. Preparation of ethylene-propylene copolymer

The procedure of Part B above is repeated except that: (1) during the saturation with monomers and for 22 minutes after Catalyst Solution 2—B has been added, the ethylene and propylene are introduced in the feed stream at rates of 400 cc./minute and 2260 cc./minute, respectively; thereafter the rates are changed to 500 cc./minute and 2820 cc./minute, respectively; (2) the reaction is initiated at 36.8° C.; (3) the temperature of the charge remains between 36.8 and 38.8° C. 32.6 grams of a resilient snappy copolymer is obtained which exhibits an intrinsic viscosity of 3.48. A pressed film exhibits an absorbence ratio value of 1.88.

F. Response of the catalyst toward propylene

The apparatus employed is described in Part A.

A liter of purified tetrachloroethylene is saturated with monomers at 25° C. by introduction for a 15-minute period of a gas feed mixture supplying ethylene and propylene at the rates of 400 cc./minute and 2260 cc./minute, respectively. 10 milliliters of a 0.1 molar solution of vanadyl chloride in tetrachloroethylene and 50 milliliters of Catalyst Solution 2—B, in turn, are added over a 5-second period and the ethylene stream is shut off. After 3 minutes the rate of propylene addition is decreased to 1000 cc./minute. During the following 95 minutes very little propylene uptake is observed; the viscosity of the charge remains constant. The temperature rises only to 28.2° C. No apparent propylene homopolymerization is occurring. When ethylene is added to the feed stream (400 cc./minute, ethylene; 1200 cc./minute, propylene), gas uptake again occurs and the viscosity of the charge begins to increase.

G. Bromination of ethylene-propylene copolymers

Equal weights of the copolymers prepared by the procedures of Parts B and E above are blended together on a cold rubber roll mill. 55 grams of the blend is dissolved with stirring under nitrogen in 2500 milliliters of hot carbon tetrachloride. A solution of 2.51 grams of bromine in 100 milliliters of carbon tetrachloride is added with stirring to the copolymer-blend solution. The resulting solution is exposed to ultraviolet light for one hour while rapidly agitated under nitrogen. Nearly complete decolorization occurs. The solution is then gased with ethylene for about 15 minutes to removed any small remaining amount of unreacted bromine. The carbon tetrachloride and ethylene bromide are stripped off under vacuum; the brominated copolymer thus isolated is dried by sheeting on a warm rubber mill. 56.5 grams of material is obtained displaying an intrinsic viscosity (30° C. in tetrachloroethylene) of 2.25.

H. Curing of the brominated ethylene-propylene copolymer blend 100 grams of the brominated copolymer blend prepared in Part G above is compounded on a cold rubber roll mill with 2 grams of magnesium oxide, 45 grams of super abrasion furnace black, 0.5 gram of N-phenyl-beta-naphthylamine, 5 grams of "Circo" oil, 5 grams of zinc oxide, 1 gram of 2,2'-dithiobisbenzothiazole, 1 gram of tellurium diethyldithiocarbamate, and 1 gram of sulfur. The stock is cured for one hour at 150° C. The vulcanizate displays the following properties: $M_{300}$ (25° C.), 780 p.s.i.; $T_B$ (25° C.), 3520 p.s.i.; $E_B$ (25° C.), 630%; $M_{300}$ (70° C.), 590; $T_B$ (70° C.), 2030 p.s.i.; $E_B$ (70° C.), 590%; Yersley resilience (25° C.), 55%; Compression set, 27%, Shore A hardness, 63.

EXAMPLE 3

A. Apparatus

The apparatus is the same as that described in Part A of Example 2 except that a 5-liter glass resin flask is employed for the reactor.

B. Preparation of ethylene-propylene copolymer

All operations prior to the isolation of the copolymer are carried out under a blanket of nitrogen to avoid contamination by atmospheric oxygen and water vapor.

3.5 liters of tetrachloroethylene, which has been passed through a silica gel column and sparged with nitrogen, is added to the reaction flask at room temperature, agitation is begun, and gaseous ethylene and propylene are introduced below the liquid surface as a mixture at rates of 800 cc./minute and 3200 cc./minute, respectively. After about 15 minutes the solvent is saturated. Excess gas is allowed to escape through the gas outlet tube. The temperature of the saturated solution is 26.8° C. Then 35 milliliters of a 0.1 M solution of vanadyl chloride (0.0035 mole) in tetrachloroethylene and 17.5 milliliters of Catalyst Solution 2—B are separately and rapidly added, in turn, by means of syringes through an opening in the reactor sealed with a soft rubber cap. The charge turns a deep violet color and rapid absorption of the monomers occurs. In 15 minutes the temperature rises to 38° C. The feed stream composition is altered and ethylene and propylene are thereafter supplied at the rates of 1000 cc./minute and 3000 cc./minute, respectively. During the following 35 minutes the temperature rises to a maximum of 42.8° C.; thereafter it slowly falls to 37.8° C. The charge becomes increasingly viscous. After the 1:3 monomer mixture has been introduced for 3 hours and 45 minutes, the catalyst is deactivated by addition of 20 milliliters of n-butanol containing 1 gram of 2,2'- methylenebis(6-tert-butyl-4-methylphenol) antioxidant. The charge is then poured into 7 liters of a 1:1 acetone-n-butanol mixture to precipitate the polymer which is subsequently cut into small pieces and washed with acetone. The polymer is sheeted out and partially dried at 50° C. on a mill. About 0.1 gram of 2,2'-methylenebis(6-tert-butyl-4-methylphenol) is added and the polymer is finally dried at 100° C. (1 mm. Hg). 124 grams of a snappy resilient elastomer is obtained which exhibits an intrinsic viscosity of 4.70. A pressed film exhibits an absorbence value of 1.62.

EXAMPLE 4

A. *Apparatus*

A nitrogen blanket is used to avoid contamination by atmospheric oxygen and water vapor.

A 5-liter 4-neck glass flask is employed which is fitted with a glass counter-pitched 2-bladed agitator, gas inlet and outlet tubes, a thermometer, a thermometer holder with a rubber syringe, and an opening to permit introduction of liquid reagents. The gas outlet tube leads to a cold trap (surrounded with an ice-acetone bath) and thence to a bubble-trap filled with a hydrocarbon oil to prevent back-flow of air into the reactor.

The relative amounts of ethylene and propylene in the gas feed stream are controlled by suitably calibrated rotameters which are placed in monomer gas feed lines ahead of the T in which the gases are mixed. Before they enter the reactor, the gases are passed through a silica gel drying tower, an "ascarite" tower, thence through a scrubber containing pure aluminum triisobutyl, and finally through a cold trap (packed with a mixture of ice and acetone). The gas inlet tube is so arranged that the monomers are introduced below the liquid surface in the reactor.

B. *Preparation of ethylene-propylene copolymer*

2.5 liters of tetrachloroethylene, which has been passed through a silica gel column and sparged with nitrogen, is added to the reaction flask, agitation is begun, and a gaseous monomer mixture is introduced supplying ethylene and propylene at rates of 1000 cc./minute and 3000 cc./minute, respectively. After about 15 minutes the solvent is saturated with each monomer; excess gas escapes through the gas outlet tube. To the solution at 28.5° C. are rapidly added, in turn, 10 milliliters of a 0.25 M solution of vanadyl chloride in tetrachloroethylene (0.0025 mole), and 12.5 milliliters of Catalyst Solution 2—B by means of syringes through the opening in the reactor sealed with a soft rubber cap. The mass turns violet and begins to thicken. Heat is evolved and the temperature rises to 37° C. within 7 minutes. During the following 90 minutes, the temperature is kept between about 39–41° C. The reaction mixture becomes steadily more viscous until agitation becomes ultimately ineffectual. A solution of 0.5 gram of 4,4'-thiobis(2-tert-butyl-5-methylphenol) in 10 milliliters of isopropyl alcohol is introduced. The deactivated charge is then poured into 7 liters of isopropyl alcohol. The copolymer thereby precipitated is washed with acetone in a blendor and milled at 50° C. and 0.2% by weight 4,4'-thiobis(2-tert-butyl-5-methylphenol) is then added. Finally, the copolymer is dried in a vacuum oven (130° C. at 1 mm. Hg) for 1 hour. 81 grams of resilient nearly colorless copolymer (4—B) is obtained displaying an intrinsic viscosity of 3.70. A pressed film exhibits an absorbence ratio of 1.71.

C. *Preparation of ethylene-propylene copolymer*

The procedure of Part B above is repeated 4 times to obtain copolymers 4—C—1, 4—C—2, 4—C—3 and 4—C—4.

D. *Curing of copolymer blend*

The copolymers 4—B, 4—C—1, 4—C—2, 4—C—3 and 4—C—4 prepared above are blended on a cold rubber roll mill. The blend obtained exhibits the following properties: intrinsic viscosity 3.48, absorbence ratio 1.75, and number-average molecular weight (by osmotic pressure in benzene) of 76,400.

The blend is compounded on a cold rubber roll mill according to the following recipe: 200 grams of blend, 0.8 gram of p-nitroso-N-methyl-N-nitroso-aniline, 90 grams of superabrasion furnace black and 5.5 grams of bis(alpha,alpha-dimethylbenzyl) peroxide. The compounded stock is cured for 30 and 60 minutes at 153° C. The vulcanizates obtained display the following properties:

| Properties | Cure time | |
|---|---|---|
| | 30 min. | 60 min. |
| $M_{300}$ (p.s.i.) at 25° C | 1,200 | 1,220 |
| $T_B$ (p.s.i.) at 25° C | 4,000 | 3,410 |
| $E_B$ (percent) at 25° C | 510 | 460 |
| $M_{300}$ (p.s.i.) at 70° C | 1,060 | 1,000 |
| $T_B$ (p.s.i.) at 70° C | 1,760 | 1,260 |
| $E_B$ (percent) at 70° C | 380 | 340 |
| After hot tube aging (14 days, 121° C.) in air: | | |
| $M_{300}$ (p.s.i.) at 25° C | 1,050 | 1,270 |
| $T_B$ (p.s.i.) at 25° C | 2,510 | 2,750 |
| $E_B$ (percent) at 25° C | 460 | 430 |

EXAMPLE 5

A. *Apparatus*

The apparatus is the same as that described in Part A of Example 2 except that a 5-liter 4-neck glass reaction flask is employed.

B. *Preparation of ethylene-propylene copolymer with a catalyst which can homopolymerize propylene*

3 liters of tetrachloroethylene, which has been passed through a silica gel column and sparged with nitrogen, is added under nitrogen to the dry reaction flask at room temperature (about 25° C.), agitation is begun, and gaseous ethylene and propylene are introduced below the liquid surface as an equimolar mixture at the rate of 6000 cc./minute. A saturated monomer solution is attained and excess gas escapes through the gas outlet tube. After about 20 minutes a 4-ml. charge of a 1.6 M solution of aluminum triisobutyl in cyclohexane and a 0.47-ml. charge of vanadyl chloride are separately and rapidly added, in turn, by means of syringes through an opening in the reactor sealed with a soft rubber cap. The tetrachloroethylene solution immediately turns a clear amber color, heat is evolved, and the viscosity begins to increase. Within a minute the temperature has risen to about 40° C. A cooling bath is applied and during the succeeding half-hour the reaction mixture is agitated at 35–40° C. while the ethylene-propylene gas feed stream is introduced at the rate of 600 cc./min. (3000 cc./min. ethylene, 3000 cc./min. propylene). Finally the catalyst is deactivated by addition of 5 milliliters of n-butanol containing 2,2'-methylenebis(6-tert-butyl-4-methylphenol) antioxidant. The gas monomer stream is shut off. A continual blanket of nitrogen is kept over the polymer during the subsequent isolation. The reaction mixture is poured into 3 liters of n-butanol and the polymer separates as a rubbery swollen solid which is squeezed free of excess solvent, washed several times with fresh n-butanol, slurried with acetone in a high speed blender, and dried by sheeting on a hot rubber roll mill. 105 grams of copolymer is thereby obtained which displays an intrinsic viscosity of 3.23. The absorbence ratio value of a pressed film is 1.61.

C. *Curing of copolymer*

100 grams of the copolymer prepared in B above is compounded on a rubber roll mill at 80° C. with 0.2 gram of 2,2'-methylenebis(6-tert-butyl-4-methylphenol), 50 grams of superabrasion furnace black, and 0.4 gram of p-nitroso-N-methyl-N-nitrosoaniline. The roll mill is cooled to 40° C. and 3.45 grams of bis(alpha,alpha dimethylbenzyl) peroxide is introduced. The stock thereby obtained is cured for 60 minutes at 153° C. The vulcanizate displays the following properties: at 25° C. $M_{200}$, 670 p.s.i.; $M_{300}$, 1440 p.s.i.; $T_B$, 2,600 p.s.i.; $E_B$, 400%.

This example shows that a copolymer, prepared with a catalyst system of aluminum triisobutyl and vanadyl chloride, results in an elastomer having inferior properties, particularly tensile strength at 25° C., as compared with the copolymers of this invention.

As many widely different embodiments of this invention may be made without departing from the spirit and scope thereof, it is to be understood that this invention is not limited to the specific embodiments thereof except as defined in the appended claims.

What is claimed is:

1. An ethylene-propylene copolymer which is capable of being cured to an elastomer, said copolymer having an intrinsic viscosity in tetrachloroethylene at 30° C. of at least 1 and exhibiting an infrared absorbence ratio ranging from about 0.85 to about 2.0, said infrared absorbence ratio being the ratio of the infrared absorbence at 8.65 microns to the absorbence at 2.3 microns of a film of said copolymer about 0.1 mm. thick, said copolymer being prepared by a process which comprises contacting ethylene and propylene, in a molar ratio of 1:1 to 1:5.7, in tetrachloroethylene at a temperature of between about 20° C. and 60° C. with a catalyst prepared from aluminum triisobutyl, aluminum chloride and vanadyl chloride, the mole ratio of aluminum chloride to aluminum triisobutyl being 2:1 and the mole ratio of aluminum to vanadium being 5:1.

2. An ethylene-propylene copolymer as described in claim 1 in the form of a film.

3. A cured elastomer obtained by heating the ethylene-propylene copolymer of claim 1 with an organic peroxide.

4. A cured elastomer according to claim 3 wherein the organic peroxide is dicumyl peroxide.

References Cited in the file of this patent

UNITED STATES PATENTS

| | | |
|---|---|---|
| 2,824,089 | Peters et al. | Feb. 18, 1958 |
| 2,825,721 | Hogan et al. | Mar. 4, 1958 |
| 2,886,561 | Reynolds et al. | May 12, 1959 |
| 2,888,424 | Precopio et al. | May 26, 1959 |
| 2,890,214 | Brightbill et al. | June 9, 1959 |

FOREIGN PATENTS

| | | |
|---|---|---|
| 794,785 | Great Britain | May 7, 1958 |
| 543,941 | Belgium | June 26, 1956 |
| 538,782 | Belgium | May 2, 1956 |